US012767093B2

(12) United States Patent
Jeong

(10) Patent No.: US 12,767,093 B2
(45) Date of Patent: Oct. 20, 2026

(54) METHOD FOR CONTROLLING A VEHICLE AND A VEHICLE IMPLEMENTING THE SAME

(71) Applicants: Hyundai Motor Company, Seoul (KR); Kia Corporation, Seoul (KR)

(72) Inventor: Dong Hyuk Jeong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 76 days.

(21) Appl. No.: 18/748,256

(22) Filed: Jun. 20, 2024

(65) Prior Publication Data

US 2025/0058743 A1 Feb. 20, 2025

(30) Foreign Application Priority Data

Aug. 16, 2023 (KR) ........................ 10-2023-0106883

(51) Int. Cl.

*B60R 25/30* (2013.01)
*B60R 25/04* (2013.01)
*B60R 25/102* (2013.01)
*B60R 25/104* (2013.01)
*H04N 7/18* (2006.01)

(52) U.S. Cl.

CPC ............ *B60R 25/305* (2013.01); *B60R 25/04* (2013.01); *B60R 25/102* (2013.01); *B60R 25/104* (2013.01); *H04N 7/18* (2013.01)

(58) Field of Classification Search

CPC ..... B60R 25/305; B60R 25/04; B60R 25/102; B60R 25/104; H04N 7/18

USPC ........................................................... 701/23

See application file for complete search history.

(56) References Cited

U.S. PATENT DOCUMENTS

| | | | | |
|---|---|---|---|---|
| 9,288,270 | B1 * | 3/2016 | Penilla | H04L 67/141 |
| 9,688,247 | B1 * | 6/2017 | Jayaraman | H04L 9/32 |
| 2006/0022809 | A1 * | 2/2006 | Lessard | B60R 25/04 340/5.8 |
| 2014/0043152 | A1 * | 2/2014 | Lippman | B60W 30/14 340/438 |
| 2015/0239357 | A1 * | 8/2015 | Huntzicker | H04L 63/062 701/22 |
| 2017/0270490 | A1 * | 9/2017 | Penilla | G07C 5/0808 |
| 2019/0259227 | A1 * | 8/2019 | Oesterling | G06Q 10/02 |
| 2019/0287080 | A1 * | 9/2019 | Penilla | G06Q 10/1093 |
| 2020/0361335 | A1 * | 11/2020 | Penilla | B60L 53/65 |
| 2021/0009111 | A1 * | 1/2021 | Kang | B60W 30/06 |
| 2021/0326767 | A1 * | 10/2021 | Mendes | G06Q 50/40 |
| 2021/0326768 | A1 * | 10/2021 | Mendes | B60R 25/25 |
| 2022/0109662 | A1 * | 4/2022 | Jenkins | G07C 9/00174 |
| 2024/0007306 | A1 * | 1/2024 | Layouni | B60R 25/241 |
| 2024/0185658 | A1 * | 6/2024 | Setterberg | G07C 9/00309 |

* cited by examiner

*Primary Examiner* — Krishnan Ramesh
(74) *Attorney, Agent, or Firm* — Fox Rothschild LLP

(57) ABSTRACT

Described is a method for controlling a vehicle, which comprises a video recording device comprising a camera module for capturing video around the vehicle and a controller configured to control an access/start of a share key, includes setting a usage limit range for the share key, allowing an access/start of the vehicle by the share key, determining whether the vehicle deviates from the usage limit range during a drive initiated by the access/start, and transmitting to an external server deviation information if it is determined that the vehicle has deviated from the usage limit range.

14 Claims, 2 Drawing Sheets

METHOD FOR CONTROLLING A VEHICLE AND A VEHICLE IMPLEMENTING THE SAME

CROSS-REFERENCE TO RELATED APPLICATION

The present application claims under 35 U.S.C. § 119 (a) to the benefit of Korean Patent Application No. 10-2023-0106883, filed on Aug. 16, 2023, the entire contents of which is incorporated herein by reference in its entirety.

BACKGROUND

Technical Field

The present disclosure relates to a vehicle controlling method and a vehicle.

Background

The driving video recording device, for example, is a device for recording a video of a driving situation of a vehicle.

To this end, the driving video recording device basically includes a controller, a memory for storing a video, and a camera for capturing videos.

In general, the driving video recording device stores vehicle driving data along with a video around a vehicle while driving and records a video according to a previously input setting when a set event is detected during parking.

The driving video record system was initially referred to as a so-called black box and was only installed as an external type. However, it has recently been built-in to the vehicle before its release.

Meanwhile, the function of unlocking a doors and starting a vehicles using digital keys registered from smartphones or near field communication (NFC) card keys is widely used in vehicles. The digital keys and the card keys may be shared with a third party besides the vehicle owner and used as a share key. It is also possible to limit the usage range when sharing the digital key and the card key.

SUMMARY

An embodiment of the present disclosure proposes a scheme for resolving an issue due to the use of a vehicle by a share key being beyond a set limit range.

An embodiment of the present disclosure is directed to transmitting a video of a video recording device to an owner when the use of the vehicle has deviated from the limit range.

In addition, an embodiment of the present disclosure involves limiting the function of a vehicle in such a situation where the video recording device is stopped through a pause or stop button or the video recording is disabled due to damage.

According to an embodiment of the present disclosure, a method for controlling a vehicle, which comprises a video recording device comprising a camera module for capturing video around the vehicle and a controller configured to control an access/start of a share key, includes setting a usage limit range for the share key, allowing an access/start of the vehicle by the share key, determining whether the vehicle deviates from the usage limit range during a drive initiated by the access/start, and transmitting deviation information to an external server if it is determined that the vehicle has deviated from the usage limit range.

In at least one embodiment of the present disclosure, the deviation information includes a video of the video recording device.

In at least one embodiment of the present disclosure, the video includes a video stored in the video recording device or a real-time video of the camera module.

In at least one embodiment of the present disclosure, the deviation information further includes at least one of a deviation notification, driving information of the vehicle, and a deviation detail.

According to at least one embodiment of the present disclosure, the method further includes outputting a warning through a display device in the vehicle upon determination that the vehicle has deviated from the usage limit range.

In at least one embodiment of the present disclosure, the method further includes setting the usage limit range changeable or non-changeable.

In at least one embodiment of the present disclosure, the method further includes allowing a change of the usage limit range based on the share key if the usage limit range has been set changeable.

In at least one embodiment of the present disclosure, the setting the usage limit range changeable or non-changeable includes setting the usage limit range changeable through the external server.

According to at least one embodiment of the present disclosure, the method further includes setting a preset function of the vehicle limited upon determination that the vehicle has deviated from the usage limit range and upon determination that video recording is impossible due to operation being stopped or damage of the video recording device.

In at least one embodiment of the present disclosure, the setting the preset function includes at least one of limiting a speed of the vehicle, limiting restart of the vehicle, switching driving control of the vehicle to autonomous driving, maintaining a fuel inlet of the vehicle to be locked, and limiting electric charging of a battery of the vehicle.

According to another of embodiment, a vehicle comprises a video recording device comprising a camera module configured to capture video around the vehicle, an audio video navigation telematics (AVNT) controller, a controller configured to control an access/start by a share key, and a vehicle controller, wherein at least one controller of a controller of the video recording device, the AVNT controller, and the vehicle controller is configured to set a usage limit range for the share key, determine whether the vehicle deviates from the usage limit range during a derive initiated by the access/start by the share key, and transmit deviation information to an external server if it is determined that the vehicle has deviated from the usage limit range.

In the vehicle of at least one embodiment of the present disclosure, the deviation information includes a video of the video recording device.

In the vehicle of at least one embodiment of the present disclosure, the video includes a video stored in the video recording device or a real-time video of the camera module.

In the vehicle according to at least one embodiment of the present disclosure, the deviation information further includes at least one of a deviation notification, driving information of the vehicle, and a deviation detail.

In the vehicle of at least one embodiment of the present disclosure, the at least one controller is further configured to output a warning through a display device in the vehicle upon determination that the vehicle has deviated from the usage limit range.

In the vehicle of at least one embodiment of the present disclosure, the at least one controller is further configured to set the usage limit range changeable or non-changeable.

In the vehicle of at least one embodiment of the present disclosure, the at least one controller is further configured to allow a change of the usage limit range based on the share key if the usage limit range has been set changeable.

In the vehicle of at least one embodiment of the present disclosure, the at least one controller is further configured to allow the usage limit range to be set changeable through the external server.

In the vehicle of at least one embodiment of the present disclosure, the at least one controller is further configured to set a preset function of the vehicle limited upon determination that the vehicle has deviated from the usage limit range and upon determination that video recording is impossible due to operation being stopped or damage of the video recording device.

In the vehicle of at least one embodiment of the present disclosure, the at least one controller is further configured to perform at least one of limiting a speed of the vehicle, limiting restart of the vehicle, switching driving control of the vehicle to autonomous driving, maintaining a fuel inlet of the vehicle to be locked, and limiting electric charging of a battery of the vehicle.

According to an embodiment of the present disclosure, when the vehicle deviates from the set usage limit range while driving by a shared digital key, video of the driving video recording device is transmitted to the owner so that the owner can be aware of the situation and take necessary actions.

In addition, according to an embodiment of the present disclosure, when the driving video recording device is paused through the pause button or disabled to record video due to damage, one or more set functions of the vehicle can be limited.

As discussed, the method and system suitably include use of a controller or processer.

In another embodiment, vehicles are provided that comprise an apparatus as disclosed herein.

In a fully autonomous vehicle or system, the vehicle may perform all driving tasks under all conditions and little or no driving assistance is required from a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems and vehicles may be fully autonomous. In other certain embodiments, the present systems and vehicles may be semi-autonomous.

DETAILED DESCRIPTION

Figure 1:
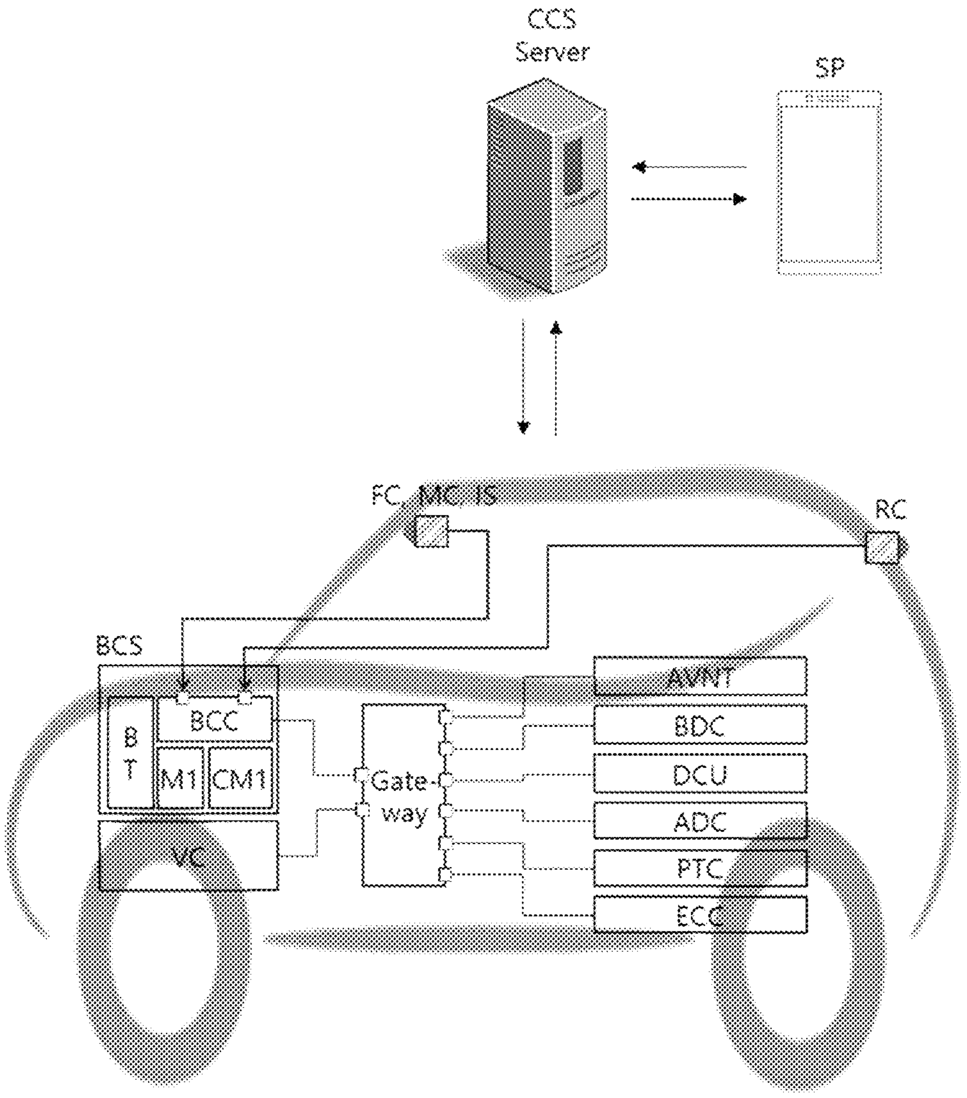
FIG. 1 is a drawing conceptually showing elements of driving video recording device according to an embodiment of the present disclosure.

Since the present disclosure is modified in various ways and has various embodiments, specific embodiments will be illustrated and described in the drawings. However, this is not intended to limit the present disclosure to specific embodiments, and it should be understood that the present disclosure includes all modifications, equivalents, and replacements included on the idea and technical scope of the present disclosure.

The suffixes "module" and "unit" used herein are used only for name distinction between elements and should not be construed as being physiochemically divided or separated or assumed that they can be divided or separated.

Terms including ordinals such as "first," "second," and the like may be used to describe various elements, but the elements are not limited by the terms. The terms are used only for the purpose of distinguishing one element from another element.

The term "and/or" is used to include any combination of a plurality of items to be included. For example, "A and/or B" includes all three cases such as "A", "B", and "A and B".

When an element is "connected" or "linked" to another element, it should be understood that the element may be directly connected or connected to another element, but another element may exist in between.

The terminology used herein is for the purpose of describing particular embodiments only and is not intended to be limiting of the disclosure. Singular expressions include plural expressions, unless the context clearly indicates otherwise. In the present application, it should be understood that the term "include" or "have" indicates that a feature, a number, a step, an operation, a component, a part, or a combination thereof described in the specification is present, but does not exclude the possibility of existence or addition of one or more other features, numbers, steps, operations, components, parts, or combinations thereof in advance.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Unless otherwise defined, all terms used herein, including technical or scientific terms, have the same meaning as that generally understood by those skilled in the art. It will be understood that terms, such as those defined in commonly used dictionaries, should be interpreted as having a meaning that is consistent with their meaning in the context of the relevant art and will not be interpreted in an idealized or overly formal sense unless expressly so defined herein.

In addition, the term "unit" or "control unit" is a term widely used for naming a controller that commands a specific function, and does not mean a generic function unit. For example, each unit or control unit may include a communication device communicating with another controller or sensor, a computer-readable recording medium storing an operating system or a logic command, input/output information, and the like, in order to control a function in charge, and one or more processors performing determination, calculation, determination, and the like necessary for controlling a function in charge.

Meanwhile, the processor may include a semiconductor integrated circuit and/or electronic elements that perform at least one or more of comparison, determination, calculation, and determination to achieve a programmed function. For example, the processor may be one of a computer, a microprocessor, a CPU, an ASIC, and a circuitry (logic circuits), or a combination thereof.

In addition, the computer-readable recording medium (or simply referred to as a memory) includes all types of storage devices in which data that can be read by a computer system is stored. For example, the memory may include at least one type of a flash memory of a hard disk, of a microchip, of a card (e.g., a secure digital (SD) card or an eXtream digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

The recording medium may be electrically connected to the processor, and the processor may retrieve and record data from the recording medium. The recording medium and the processor may be integrated or may be physically separated.

Hereinafter, the embodiments of the present disclosure will be described in detail with reference to the accompanying drawings.

FIG. 1 is a drawing conceptually showing elements of a driving video recording device according to an embodiment of the present disclosure.

Referring to FIG. 1, an embedded drive video recording device or so-called built-in cam system BCS, according to an exemplary embodiment of the present disclosure, is embedded in a host vehicle HV. This system may include several components: a camera module C, a computer-readable storage medium M1, a first communication module CM1, a microprocessor MC, an impact sensor IS, a power auxiliary battery BT, and a built-in cam controller BCC.

Here, the built-in cam is defined as the video recording device installed as a built-in type on a vehicle.

The drive video recording device of the present embodiment is a built-in type, but it is not limited thereto.

First, the camera module C includes a front camera and a rear camera in this embodiment, but it is not necessarily limited thereto. The front camera is installed to capture an image of the front area of the vehicle HV, and the rear camera is installed to capture an image of the rear area of the vehicle HV.

For example, the front camera may be installed at a position adjacent to the room mirror in the vehicle HV cabin of the window shield, and the rear camera may be installed on the rear window of the vehicle HV cabin or the rear bumper.

For example, the front camera and the rear camera have the image quality of either an HD, an FHD, or a Quad HD.

It is evident that the front camera and the rear camera do not need to have the same image quality, and a camera of an Advanced Drive Assistance System ADAS system of the host vehicle HV may be used.

Further, the camera has an aperture value of F2.0 or less, preferably F1.6 or less. If the aperture value decreases, more light is gathered so that recording may be made brighter. In addition, by applying image tuning technology to minimize the noise and the loss of light, clear recording is possible even in a dark environment.

The computer-readable recording medium M1 (hereinafter, called "memory", in short) includes all types of storage devices in which data that can be read by a computer system is stored. For example, the memory includes at least a memory type of a flash memory, of a hard disk, of a microchip, of a card (e.g., a Secure Digital (SD) card or an eXtream Digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

In this embodiment, the memory M1 is an external type of 64 Gbyte or a micro SD of more, thereof. For example, a constant recording while driving may be performed for several hours, and a constant recording while parking may be performed for several tens of hours. In addition, event recording according to impact detection may be performed up to several tens of times.

The user can easily check the contents stored in the memory in a desktop computer or the like by extracting the SD card.

The state information of the SD card may be checked through a Connected Car Service CCS, and a replacement time according to a memory state may be checked.

The CCS is a service that combines vehicle software with a wireless network to activate an in-vehicle infotainment system (i.e., Audio Video Navigation Telematics (AVNT)) and a smartphone SP), thereby increasing convenience for vehicle owners. For example, the CCS may offer features like real-time navigation, voice recognition, vehicular remote control, vehicular remote diagnosis, over-the-air OTA software update, simple payment, video and audio streaming, etc.

The first communication module CM1 is for wired or wireless communication with the exterior and is not limited to communication protocol.

In the present embodiment, the first communication module CM1 includes a communication device capable of directly communicating with nearby devices, and illustratively supports Wi-Fi. The Wi-Fi module of the present embodiment may include an Access Point (AP) function, and a user may easily and quickly access the built-in cam through, for example, a smartphone.

Due to Wi-Fi, the user can easily and quickly access the built-in cam through, for example, a smartphone.

The microphone MC is installed in the housing of the front camera FC as an example. When recording the driving video of the vehicle, this microphone enables both voice and video to be recorded simultaneously.

The impact sensor IS senses an external impact and may be a one-axis or a three-axis acceleration sensor.

The impact sensor IS may be installed in the housing of the front camera FC exclusively for the built-in cam BCS, but other acceleration sensors installed in the host vehicle may be used as well.

The signals of the impact sensor IS may be a starting points for a later described event recording, and the degree of impact serving as a references thereof can be set by the user.

For example, the user may select an impact detection sensitivity which is a criterion for recording an event when setting the built-in cam BCS through a display screen (e.g., a later described AVNT screen) in the vehicle.

For example, the impact sensitivity may be classified into five levels: the first level (highly unresponsive), the second level (unresponsive), the third level (normal sensitivity), the fourth level (sensitive), and the fifth level (highly sensitive).

The built-in cam system BCS receives power from a battery (e.g., a 12V battery) installed in the vehicle HV.

Although the system operates using the vehicle HV battery during both driving and parking, there may be a risk of over-discharge the vehicle HV battery. To address this issue, the present embodiment includes the power auxiliary battery BT.

In the present embodiment, the built-in cam system BCS receives power from any one of the battery of the vehicle HV, of the alternator in the case of the internal combustion engine vehicle, and of the lower DC/DC converter in the case of the electric vehicle, while receiving power from the power auxiliary battery BT during parking. However, it is not limited thereto.

The power auxiliary battery BT is charged and discharged depending on an operating environment of the vehicle HV and supplies optimal power for recording and OTA software update during parking.

The charging of the power auxiliary battery BT may be performed by a vehicle battery (a low voltage battery or a high voltage battery of an electric vehicle) or by an alternator in the case of an internal combustion engine vehicle.

The built-in cam controller BCC is an upper level controller that controls other components of the built-in cam BCS and exchanges signals with a vehicle controller VC and/or an AVNT of the host vehicle, a Body Domain Controller BDC, a Data Communication Unit DCU, an Autonomous Driving Controller ADC, a Power-Train Controller (PTC), an Electric Charging Controller (ECC), etc.

Here, the body domain controller BDC is a platform controller that enhances electronic convenience in the body domain region. For example, it manages various body control functions such as opening and closing of the gas inlet, share key entrance/start function, tire air pressure monitoring function, an immobilizer function, share key authentication function, autonomous parking related control function, etc.

Entering/starting of the share key means a function of enabling door to unlock and starting of a vehicle by a digital key or an NFC card key stored in the smart phone SP.

When the digital key is registered in the smart phone SP, not only the door can be unlocked and started by the NFC, but also functions such as remote door locking and unlocking, starting a remote door, emergency alarm, trunk opening, and the like can be implemented through low power Bluetooth communication.

Furthermore, Ultra-Wideband (UWB) wireless technology may be used as the short-range, high-speed, wireless communication technology, and if the user has a smart phone SP, the user can open and close a vehicle door handle without touching the smart phone SP, and if the smart phone SP is only in the vehicle, the user can start the vehicle with a digital key.

NFC card keys are easy to carry, so they are useful in situations where one has to momentarily entrust the keys to another person such as in valet parking.

When the vehicle entrance/start is requested by the share key, the body domain controller BDC may perform the user authentication of the share key and transmit the result thereof to the related controller.

The digital key may be transmitted to smartphone of another person and stored to be shared, and the owner may visually and/or spatially set a usage limit range for vehicle sharing by the digital key or card key.

For example, the owner may set an end time for share usage of the vehicle, or may set a time zone of share usage.

Furthermore, the owner, for example, may limit a certain range (i.e., a radius of several to several tens of km) or an administrative division (i.e., City of Seoul) to a spatial usage range of the share usage from the current location of the vehicle.

Naturally, it is evident that this usage limit range can be lifted by the owner.

For example, a user interface for setting the usage limit may be provided through the AVNT screen, and the owner may set the time or space limit through the UI.

In addition, the usage limit range setting by the owner may be transmitted to the vehicle controller VC or the built-in cam controller BCC.

As the vehicle is started and driven by the share key, the AVNT may check whether the vehicle deviates from the usage limit range. Naturally, the present embodiment is not necessarily limited thereto, and whether or not the usage limit range is deviated may be determined by the vehicle controller VC or the built-in cam controller BCC by receiving the current location information of the vehicle from the AVNT.

When the deviation of the usage limit range is confirmed, the deviation information is transmitted to the CCS server.

The deviation information includes a video of the built-in cam (BCS) and may include vehicle driving information (i.e., a location, a time, etc.), a notification of deviation, a content of deviation, etc.

In this case, the AVNT may output a warning message about the deviation from the usage limit range to the display according to a predetermined command or by a request from the CCS server, from the vehicle controller VC, or from the built-in cam controller BCC.

When the body domain controller BDC has deviated from the usage limit range, the body domain controller BDC receives a request of another controller such as a AVNT controller or a built-in cam controller BCC and controls a use authentication for the vehicle.

In addition, the body domain controller BDC may control the opening and closing of the fuel inlet according to a request of another controller and control the vehicle starting by the share key. For example, the body domain controller BDC may prevent the vehicle from starting by the share key.

The communication unit DCU includes a modem and controls wireless communication with the exterior of the vehicle such as a CCS server to perform a CCS function.

An autonomous driving controller ADC controls self-driving of a vehicle. For example, the autonomous driving controller ADC has a self-driving mode and a manual mode of the driver driving, and controls switching of control between the self-driving mode and the manual mode according to selection of the driver or satisfaction of a set condition.

The power train control furnace PTC controls a power train in the vehicle. For example, the transmission function of the powertrain may be controlled according to the vehicle speed. The vehicle speed may be limited by the shift function control of the power train control PTC.

The charge controller ECC controls charging of a driving battery of the electric vehicle. For example, an on-board charger OBC is controlled to manage the charging of a vehicle battery by an external charger.

For exchanging signals, the devices mutually connect to a gateway of an in-vehicle communication network. For example, the in-vehicle communication network may include at least one of a local interconnect network LIN, a controller area network CAN, a FlexRay, or an Ethernet.

The built-in cam controller BCC controls other components to perform real-time recording during driving, real-time recording during parking, recording events to be recorded according to the impact signal of the impact sensor, etc.

In addition, driving information of the vehicle may be recorded together during recording.

The vehicle driving information may include at least one of time, vehicle speed, gear position, turn signal information, degree of impact detection (one corresponding to the above-described five levels), or global positioning system (GPS) location information.

The vehicle driving information may be received from the vehicle controller VC, but the built-in cam controller BCC may also directly receive the vehicle driving information from a corresponding module or component of the vehicle. For example, a vehicle speed may be directly received from a speed sensor of a vehicle, turn signal information (or turn signal information from a turn signal controller) may be directly received from a turn signal controller, and GPS location information may be received from a AVNT or a GPS receiver.

As described above, the event recording is performed when the event occurrence is detected during parking according to the impact detection sensitivity set by the user.

In event recording, the system records from a user-selected time before the event occurrence to a set time after the event. This duration can be adjusted by the user.

The AVNT is connected to the built-in cam controller BCC through the vehicle controller VC or directly, and the AVNT screen may function as a user interface for allowing the user to select various setting parameters of the built-in cam (BCS) system (BCS).

The built-in cam controller BCC may transmit the recorded content to an external server (i.e., a CCS server) according to a set period, a user selection, or an event (i.e., a degree of impact detection) of the user setting.

The built-in cam controller BCC may include a memory and a processor to perform the function.

For example, the processor may include a semiconductor integrated circuit and/or electronic devices that perform at least one or more of comparison, determination, calculation, or determination to achieve a programmed function. For instance, the processor may be a computer, a microprocessor, a CPU, an ASIC, a circuitry (logic circuits), either individually or in combination.

The memory may be any type of storage device that stores data that can be read by a computer system, and may include, for example, at least one of a flash memory type, a hard disk type, a micro type, a card type (e.g., a secure digital (SD) card or an eXtream digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

Operating software of the BCC is stored in the memory, and the processor reads and executes the corresponding software to perform the function of the BCC.

In addition, the built-in cam controller BCC includes a buffer memory BM for determination, calculation, and the like in the processor MP.

Also, the built-in cam controller BCC includes a super capacitor SC. The super capacitor SC is charged when power is applied to the built-in cam controller BCC.

When power is suddenly cut off due to impact, damage, or the like, power charged in the super capacitor SC is used to complete video storage that is in progress.

For example, the super capacitor SC have a charging capacity capable of maintaining the power of the built-in cam controller BCC from several to tens of seconds.

Meanwhile, a smart phone SP is illustrated as a user terminal in FIG. 1, and a user may install an exclusive application (hereinafter, referred to as a “CCS phone app”) downloaded from a CCS server in the smart phone SP and use a supporting function thereof.

For example, it is possible to set a vehicle usage limited range by the share key through the CCS phone app. In addition, as later described, when the user deviates from the usage limit range as later described, the deviation information may be received and read through the CCS phone app.

Figure 2:
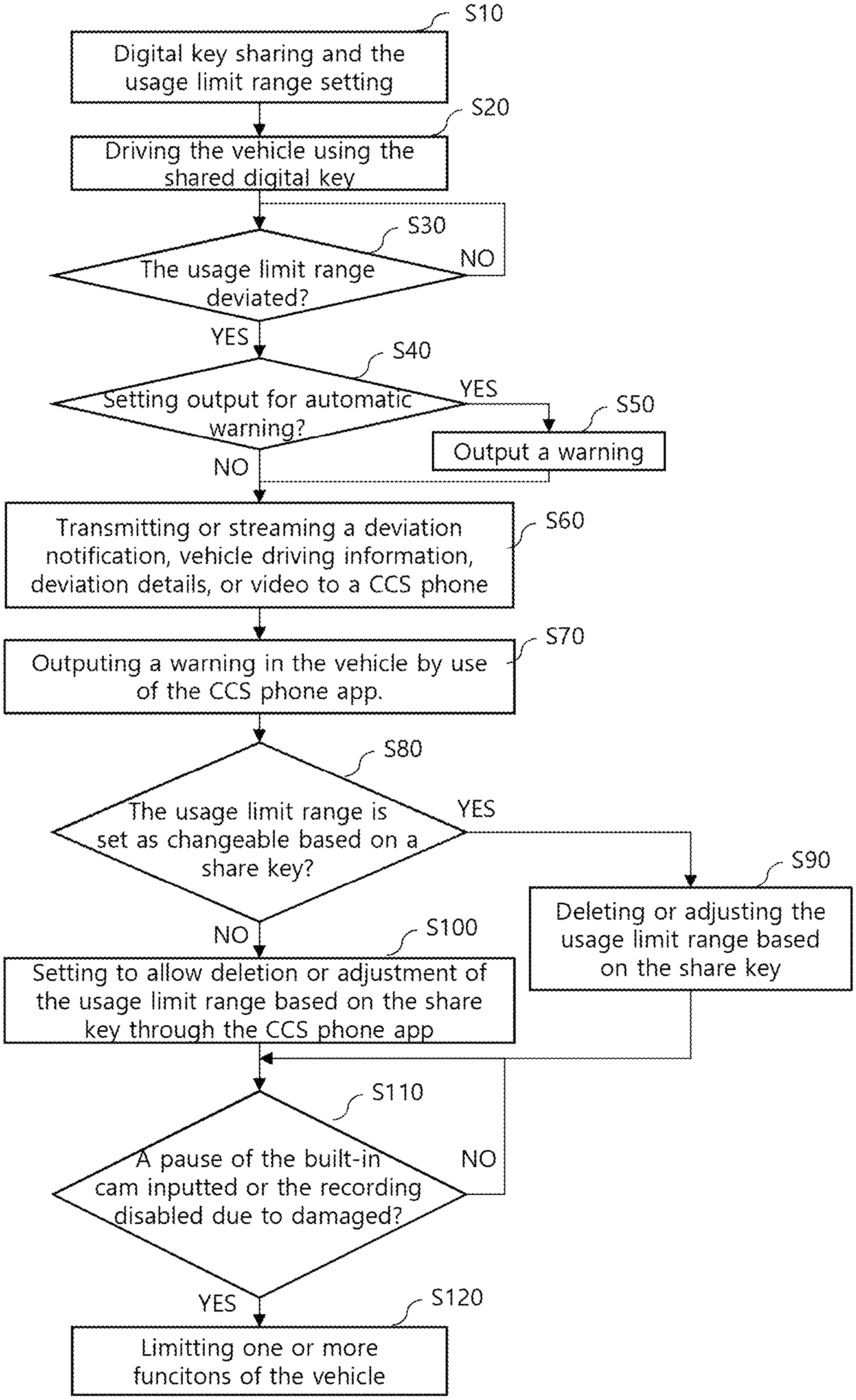
FIG. 2 is a flowchart illustrating a vehicle control process according to an embodiment of the present disclosure.

Hereinafter, a control process according to an embodiment of the present disclosure will be described in detail with reference to FIG. 2. Although FIG. 2 illustrates a case where a digital key is shared for convenience, the present embodiment is not limited thereto, and it is evident that it may be applied to a case where a card key is shared.

First, the digital key is shared by the owner to another person, and the usage limit range is set in S10.

It is evident that setting the usage limited range does not need to occur simultaneously with digital key sharing; it can be configured in advance.

As described above, the usage limit range may be set by the user interface output on the AVNT screen or through the CCS phone app.

S20 shows illustrating the vehicle starting and driven with the shared digital key after S10.

That is, in S20, the person who has been granted the shared digital key uses the digital key to unlock the door to get in the vehicle and starts the vehicle with the shared digital key for driving.

While traveling, it is checked whether the usage limit range has deviated in S30.

The deviation check may be performed by any one of the vehicle controller VC, the AVNT controller, or the built-in cam controller BCC, as described above.

For example, spatial deviation of the vehicle may be determined by comparing a current location of the vehicle received from the AVNT controller or the GPS receiver with a spatial setting for a usage limit range. Also, temporal deviation can be assessed by comparing current time with the time settings established for the usage limit range.

If it is determined that the user has deviated, it is checked whether an automatic warning output is set when the user leaves in S40.

If the automatic warning output is set (YES of S40), a warning message is output through the AVNT screen which is one of the display devices in the vehicle in S50.

The setting of the automatic warning output for deviation may be performed through the user interface of the AVNT screen or the CCS phone app.

Next, in a situation where it is determined that the user has left the mobile terminal, the deviation information thereof is transmitted to the CCS phone app in S60.

The deviation information may include a notification message, driving information (i.e., a vehicle location, a time, etc.), information regarding whether a vehicle has deviated from a spatial and/or temporal range, information regarding driven deviation of the relevant vehicle, and a built-in cam (BCS) video.

The BCS video includes a video stored in the BCS memory M1 and/or a real-time video of the camera module FC and RC.

The deviation information may be transmitted from any one of the built-in cam controller BCC, the vehicle controller VC, or the AVNT controller to the CCS server through the communication unit DCU.

The deviation information is transmitted to the user terminal SP and read through the CCS phone app.

In this case, the user outputs the warning in the vehicle through the CCS server using the CCS phone app (S70).

Meanwhile, the built-in cam controller (BCC), the vehicle controller (VC), or the AVNT controller checks if the usage limit range settings need to be changed based on the shared digital key.

That is, in S80, it is determined whether the driver who has deviated from the current usage limit range is set to be able to change the usage limit range through the user interface of the AVNT screen in the vehicle.

If the setting is set to as changeable (YES. S80), the usage limit range set by the owner may be changed by deletion or adjustment based on the shared digital key (S90).

To this end, for example, a message prompting whether to change the usage limit range may appear on the AVNT screen. The driver may then make adjustments through the user interface. Following this, either the built-in cam controller BCC, the vehicle controller VC, or the AVNT, may reflect the changed content upon the subsequent control.

Here, it is evident that the setting of the usage limit range may be changed based on the shared digital key through a user interface provided on the AVNT screen or the CCS server by using the CCS phone app.

Meanwhile, there may be a request for change through the CCS phone app for the usage limit range, and in this case, the change is allowed in S100.

That is, the owner proceeds a change of the set usage limit range through the CCS phone app, and the change or request is received and reflected in one of the built-in cam controller BCC, the vehicle controller (VC), or the AVNT controller through the CCS server.

Next, when it is determined in S110 that the pause of the operation of the built-in cam BCS is input or the recording is not possible due to the damage of the built-in cam BCS, the set function for the vehicle in S120 is limited.

Here, the limits of the set function, for example, include limiting the speed of the vehicle through a powertrain controller PTC.

In addition, the restriction of the function include, for example, restricting the restart of the vehicle through the body domain controller BDC.

In self-driving vehicles, some of the function limitations includes witching the driving control of the vehicle to self-driving through an autonomous driving controller ADC. In this case, the autonomous driving controller ADC directs the vehicle to safely stop on a shoulder of the road.

Further, in the case of a hybrid vehicle or an internal combustion engine vehicle, the function limitation includes maintaining the refueling port of the vehicle in a locked state through the body domain controller BDC. f In addition, when the vehicle is an electric vehicle or a plug-in, hybrid vehicle, limiting the electric charge of the battery of the vehicle through the charge controller ECC is one of the function limits, thereof.

What is claimed is:

1. A method for controlling a vehicle comprising a video recording device comprising a camera module for capturing video around the vehicle and a controller configured to control an access/start of a share key, the method comprising:

setting a usage limit range for the share key;

allowing an access/start of the vehicle by the share key;

determining whether the vehicle deviates from the usage limit range during a drive initiated by the access/start; and when it is determined that the vehicle deviates from the usage limit range, triggering a management operation by transmitting deviation information to an external server;

wherein the deviation information is transmitted as a consequence of the determination that the vehicle has deviated from the usage limit range;

wherein the deviation information comprises a video of the video recording device;

wherein the video comprises a video stored in the video recording device or a real-time video of the camera module; and wherein the deviation information further comprises at least one of a deviation notification, driving information of the vehicle, or a deviation detail.

2. The method of claim 1, further comprising outputting a warning through a display device in the vehicle upon determination that the vehicle has deviated from the usage limit range.

3. The method of claim 1, further comprising setting the usage limit range changeable or non-changeable.

4. The method of claim 3, further comprising allowing a change of the usage limit range based on the share key if the usage limit range has been set changeable.

5. The method of claim 3, wherein the setting the usage limit range changeable or non-changeable comprises setting the usage limit range changeable through the external server.

6. The method of claim 1, further comprising, as a part of the management operation, setting a preset function of the vehicle limited upon determination that the vehicle has deviated from the usage limit range and upon determination that video recording is impossible due to operation being stopped or damage of the video recording device.

7. The method of claim 6, wherein the setting the preset function comprises at least one of limiting a speed of the vehicle, limiting restart of the vehicle, switching driving control of the vehicle to autonomous driving, maintaining a fuel inlet of the vehicle to be locked, and limiting electric charging of a battery of the vehicle.

8. A vehicle comprising:

a video recording device comprising a camera module configured to capture video around the vehicle;

an audio video navigation telematics (AVNT) controller;

a controller configured to control an access/start by a share key; and a vehicle controller, wherein at least one controller of a controller of the video recording device, the AVNT controller, and the vehicle controller is configured to:

set a usage limit range for the share key;

determine whether the vehicle deviates from the usage limit range during a drive initiated by the access/start; and when it is determined that the vehicle deviates from the usage limit range, triggering a management operation by transmitting deviation information to an external server;

wherein the deviation information is transmitted as a consequence of the determination that the vehicle has deviated from the usage limit range, wherein the deviation information comprises a video of the video recording device;

wherein the video comprises a video stored in the video recording device or a real-time video of the camera module; and wherein the deviation information further comprises at least one of a deviation notification, driving information of the vehicle, or a deviation detail.

9. The vehicle of claim 8, wherein the at least one controller is further configured to output a warning through a display device in the vehicle upon determination that the vehicle has deviated from the usage limit range.

10. The vehicle of claim 8, wherein the at least one controller is further configured to set the usage limit range changeable or non-changeable.

11. The vehicle of claim 10, wherein the at least one controller is further configured to allow a change of the usage limit range based on the share key if the usage limit range has been set changeable.

12. The vehicle of claim 10, wherein the at least one controller is further configured to allow the usage limit range to be set changeable through the external server.

13. The vehicle of claim 8, wherein the at least one controller is further configured, as a part of the management operation, to set a preset function of the vehicle limited upon determination that the vehicle has deviated from the usage limit range and upon determination that video recording is impossible due to operation being stopped or damage of the video recording device.

14. The vehicle of claim 13, wherein the at least one controller is further configured to perform at least one of limiting a speed of the vehicle, limiting restart of the vehicle, switching driving control of the vehicle to autonomous driving, maintaining a fuel inlet of the vehicle to be locked, and limiting electric charging of a battery of the vehicle.

* * * * *